United States Patent
Costea et al.

(10) Patent No.: US 10,043,008 B2
(45) Date of Patent: Aug. 7, 2018

(54) EFFICIENT WHITE LISTING OF USER-MODIFIABLE FILES

(75) Inventors: Mihai Costea, Redmond, WA (US);
Scott Field, Redmond, WA (US);
Damodharan Ulagaratchagan,
Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1881 days.

(21) Appl. No.: 10/977,484

(22) Filed: Oct. 29, 2004

(65) Prior Publication Data

US 2006/0095971 A1    May 4, 2006

(51) Int. Cl.
*G06F 21/56*    (2013.01)

(52) U.S. Cl.
CPC ............ *G06F 21/56* (2013.01); *G06F 21/562* (2013.01)

(58) Field of Classification Search
None
See application file for complete search history.

(56) References Cited

U.S. PATENT DOCUMENTS

| | | | | |
|---|---|---|---|---|
| 5,956,481 | A * | 9/1999 | Walsh et al. | 726/23 |
| 6,094,731 | A | 7/2000 | Waldin et al. | |
| 6,230,288 | B1 * | 5/2001 | Kuo et al. | 714/38 |
| 6,577,920 | B1 * | 6/2003 | Hypponen et al. | 700/200 |
| 6,606,479 | B2 * | 8/2003 | Cook et al. | 434/350 |
| 6,721,721 | B1 * | 4/2004 | Bates | G06F 21/562 |
| 6,880,110 | B2 | 4/2005 | Largman | |
| 6,993,660 | B1 * | 1/2006 | Libenzi et al. | 713/188 |
| 7,114,185 | B2 * | 9/2006 | Moore et al. | 726/24 |
| 7,165,076 | B2 * | 1/2007 | Bentley | G06F 21/16 |
| 7,287,279 | B2 * | 10/2007 | Bertman et al. | 726/23 |
| 7,373,664 | B2 * | 5/2008 | Kissel | G06F 21/562 |
| | | | | 713/188 |

(Continued)

FOREIGN PATENT DOCUMENTS

| EP | 1 408 393 A2 | 4/2004 |
|---|---|---|
| JP | 2001-508564 | 6/2001 |

(Continued)

OTHER PUBLICATIONS

Boykin, P.O., and V. Royehowdbury, "Personal Email Networks: An Effective Anti-Spam Tool," Feb. 3, 2004, XP002468359, University of Calif., L.A. <http://arxiv.org/PS_cache/cond-mat/pdf/0402/0402143v1.pdf> [retrieved Jan. 30, 2008].

(Continued)

*Primary Examiner* — Nadia Khoshnoodi
(74) *Attorney, Agent, or Firm* — Arent Fox LLP

(57) ABSTRACT

A system and method for efficiently determining that a received file is not malware is presented. In operation, when a file is received at a computing device, an evaluation is made as to whether the file includes user-modifiable, or superficial, data areas, i.e., areas of the file that by their nature do not typically carry or embed malware. If the file includes superficial data areas, those superficial data areas are filtered out and a file signature is generated based on the remaining portions of the received file. The file can then be compared to a list of know malware to determine if the file is malware. Alternatively, the file can be compared to a list of known, trusted files to determine whether the file is trustworthy.

20 Claims, 7 Drawing Sheets

(56) References Cited

U.S. PATENT DOCUMENTS

| | | | |
|---|---|---|---|
| 7,398,553 B1* | 7/2008 | Li | 726/22 |
| 7,984,304 B1* | 7/2011 | Waldspurger et al. | 713/187 |
| 8,056,128 B1* | 11/2011 | Dingle et al. | 726/22 |
| 2002/0069198 A1 | 6/2002 | Stebbings | |
| 2002/0144140 A1 | 10/2002 | Ellison | |
| 2002/0199116 A1 | 12/2002 | Hoene | |
| 2003/0177394 A1* | 9/2003 | Dozortsev | 713/201 |
| 2004/0172551 A1 | 9/2004 | Fielding | |
| 2004/0181691 A1 | 9/2004 | Armingaud | |
| 2004/0255163 A1* | 12/2004 | Swimmer et al. | 713/201 |
| 2005/0071432 A1 | 3/2005 | Royston | |
| 2006/0010497 A1 | 1/2006 | O'Brien | |
| 2006/0075504 A1* | 4/2006 | Liu | 726/25 |

FOREIGN PATENT DOCUMENTS

| | | |
|---|---|---|
| JP | 2003281391 | 3/2002 |
| JP | 2004259060 | 2/2003 |
| WO | 01 88673 A2 | 11/2001 |
| WO | 02 05072 A2 | 1/2002 |
| WO | WO2004-088483 | 10/2004 |

OTHER PUBLICATIONS

Morar, J.F., and D.M. Chess, "Can Cryptography Prevent Computer Viruses?" *Proceedings of the 10th Annual Virus Bulletin Conference*, Orlando, Fla., Sep. 27-29, 2000, pp. 128-138.

Boykin, P.O., and V. Royehowdbury, "Personal Email Networks: An Effective Anti-Spam Tool," Feb. 3, 2004, XP0O2468359, University of Calif., L.A. <http://arxiv.org/PS_chache/cond-mat/pdf/0402/0402143v1.pdf> [retrieved Feb. 15, 2008].

European Search Report EP 05 10 9534—Feb. 22, 2008, 7 pages.

Office Action dated Aug. 19, 2009 cited in U.S. Appl. No. 11/450,608.

Takayuki Miyake, "A Method to Detect Unknown Computer Virus Using Virtual Server", IPSJ SIG Notes, Information Processing Society of Japan, Jul. 11, 2002, vol. 102, No. 211, p. 48.

"Office action Issued in European Patent Application No. 05109534.7", dated Jan. 21, 2015, 5 Pages.

"Office Action Issued in Indian Patent Application No. 2417/DEL/2005", dated Nov. 28, 2014, 2 Pages.

* cited by examiner

EFFICIENT WHITE LISTING OF USER-MODIFIABLE FILES

FIELD OF THE INVENTION

The present invention relates to computer software and computer security, and more particularly, the present invention relates to efficient security white listing of user-modifiable files received at a computer.

BACKGROUND OF THE INVENTION

An unfortunate reality of operating a computer, especially one connected to a network, is that the computer is constantly under attack. These attacks come in a variety of forms, including, but not limited to, computer viruses, worms, computer exploits (i.e., abusing or misusing legitimate computer services), adware or spyware, and the like. While the mechanism of operation for each of these various computer attacks are quite distinct, in general, they are all designed to carry out some unauthorized, usually unwelcomed, often destructive, activity on the computer. For purposes of the present invention, these attacks will be generally referred to hereafter as malware.

As malware is a reality for computers generally, and for network computers in particular, various tools have been devised and deployed to prevent malware from performing its malicious intent on a computer. These tools include firewalls, proxies, and security settings on vulnerable applications. However, the most commonly used tool in protecting a computer against malware is antivirus software.

As those skilled in the art will appreciate, most antivirus software operates as a pattern recognition service. In particular, when a file is received by a computer, irrespective of whether the file is an executable, word processing document, image, or the like, the antivirus software protecting that computer "analyzes" the file to determine whether it is known to be malware. The antivirus software "analyzes" the file by generating a hash value, referred to as a signature, for the file. This signature is generated such that it is extremely unlikely that another file will have the same signature, and is therefore considered unique to that file. Once the signature is generated, the signature is then compared against other signatures of known malware in a so-called signature file. Thus, if the file's generated signature matches a signature of known malware in the signature file, the antivirus software has discovered the file to be malware and takes appropriate action.

Unfortunately, the signature recognition requires that the malware be previously known (and identified) in order to protect the computer from the malware. Thus, antivirus software is not a time-zero protection, i.e., protecting the computer from malware as soon as it is released on the network, or time-zero. Instead, a vulnerability window exists during which a new, unknown malware is released, and the time that antivirus software is able to protect a computer from the new malware.

FIG. 1 is a block diagram of an exemplary timeline 100 illustrating the vulnerability window associated with current antivirus software's signature recognition. As shown in FIG. 1, at some point in time, as indicated by event 102, a malicious party releases a new, unknown malware onto a network, such as the Internet. Obviously, once the new, unknown malware is released, computers connected to the network are at risk, or vulnerable. Hence, the vulnerability window is opened.

While the actual time for detecting a new malware on a network depends on numerous factors, including the virulence of the new malware, according to available statistics, it generally takes between four hours to three days for the antivirus software community, i.e., antivirus software providers, to detect, or become aware of the new malware. Once detected, as indicated by event 104, the antivirus community can begin to identify the malware. In addition to generating a signature for the new malware, identifying the malware also typically involves researching/determining the ultimate effect of the malware, determining its mode of attack, identifying system weaknesses that are exposed by the attack, and devising a plan to remove the malware from an infected computer.

After having identified the malware, which typically takes approximately four hours (at least for signature identification), an antivirus provider will post an updated signature file on its download service, as indicated by event 106. Unfortunately, computers (either automatically or at the behest of the computer user) do not immediately update their signature files. It typically takes between four hours and one week for most computers to update their signature files, as indicated by event 108. Of course, it is only after the updated signature file is downloaded onto a computer that the antivirus software can defend the computer from the new malware, thereby closing the vulnerability window 110. Indeed, depending on individual circumstances, such as when the computer owner is on vacation, updating a computer with the latest signature files can take significantly longer than one week.

As can be seen, a new, unknown malware has anywhere from several hours to several weeks to perform malicious havoc on the network community, unchecked by any antivirus software. Antivirus software is not time-zero protection. The good news is that most computers are protected before a malware tries to attack any one computer. Unfortunately, some are exposed during the vulnerability window, and are infected by the malware. To most, especially those that rely heavily upon their computers, this vulnerability window is entirely unacceptable.

Those skilled in the art will readily recognize that it is important to generate a signature for a file such that the signature uniquely identifies the file. Sophisticated algorithms and mathematics are involved with computationally generating a signature that positively identifies a file, and at the same time, does not identify any other file. Unfortunately, in order to generate a signature that uniquely, the algorithms used are extremely sensitive to the file. Any modification to a file will cause the signature generation algorithm to generate a different signature than for the original file. In other words, a simple, cosmetic change to a known malware will cause the signature generation algorithm to return an entirely different signature. Thus, a cosmetic change to a known malware (i.e., one identified by its signature in a signature file) is usually sufficient to enable the modified malware to escape detection, at least until the modified malware has been recognized, and its signature generated and stored in a signature file.

The problem of malware generally is compounded by the fact that malware is often embedded in user modifiable files. For example, malware may be disguised in and distributed as an executable script embedded within a word processing document. In these cases, the malware portion (i.e., the embedded script) is entirely unrelated to the editable portion of the document. Thus, modifications, small or large, to the data area of the word processing document will cause the complete malware file to yield a different signature than its original, while the embedded malicious script remains unaffected. These user-modifiable files include, but are not limited to, word processing documents, spreadsheets, images, HTML documents, and the like. Furthermore, malware creators, in order to stay ahead of antivirus software detection, have begun creating self-modifying malware: documents that randomly modify some portion of the file in order to remain undetected antivirus software. Clearly, then, in many cases, it is very difficult to stay ahead of the malware that is released, especially when malware must be known in order to be stopped.

In light of the above-described issues, what is needed is a system and method for permitting, or white listing, files that are known to be malware-free, or trusted, to pass freely through antivirus software or other security measures, while distrusting all others, thereby affording the computer to close the vulnerability windows typically associated with antivirus software. What is further needed is the ability to identify white listed user-modifiable files based on signature information other than the entire file. The present invention addresses these and other issues found in the prior art.

SUMMARY OF THE INVENTION

According to aspects of the present invention, a computer system for identifying whether a received file is malware, is presented. The computer system includes a processor, a communications connection, and a memory. The computer system is configured such that, upon receiving a file at the communication connection, a determination is made as to whether the received file is a user-modifiable file. If so, those portions of the user-modifiable file that are more permanent are selected. A file signature is generated based on those selected portions of the received file that are more permanent. A determination is then made as to whether the received file is malware based on the generated file signature.

In accordance with further aspects of the present invention, a method, implemented on a computing device capable of receiving files from an external source, for determining whether a received file is malware, is presented. Upon receiving a file, a determination is made as to whether the file includes superficial data areas. If the received file contains superficial data areas, those superficial data areas of the received file are filtered out. A file signature is generated based on the remaining portions of the received file that are not superficial data areas. A determination is then made as to whether the received file is malware based on the generated file signature.

In accordance with yet further aspects of the present invention, a computer-readable medium bearing computer-executable instructions which, when executed on a computing device capable of receiving files from an external source, carry out a method for determining whether a received file is malware, is presented. Upon receiving a file, a determination is made as to whether the file includes superficial data areas. If the received file contains superficial data areas, those superficial data areas of the received file are filtered out. A file signature is generated based on the remaining portions of the received file that are not superficial data areas. A determination is then made as to whether the received file is malware based on the generated file signature.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

According to aspects of the present invention, rather than generating a malware signature based on the entire user-modifiable document, only a portion of a document is used as a basis for generating the signature. More particularly, a malware signature is generated based on certain, more permanent portions of a user-modifiable file. By basing the malware signature on those portions of a user-modifiable document that tend to be more permanent, the ability of malware creators and self-modifying malware to escape detection through simple, cosmetic alterations is substantially reduced, if not completely eliminated.

Figure 1:
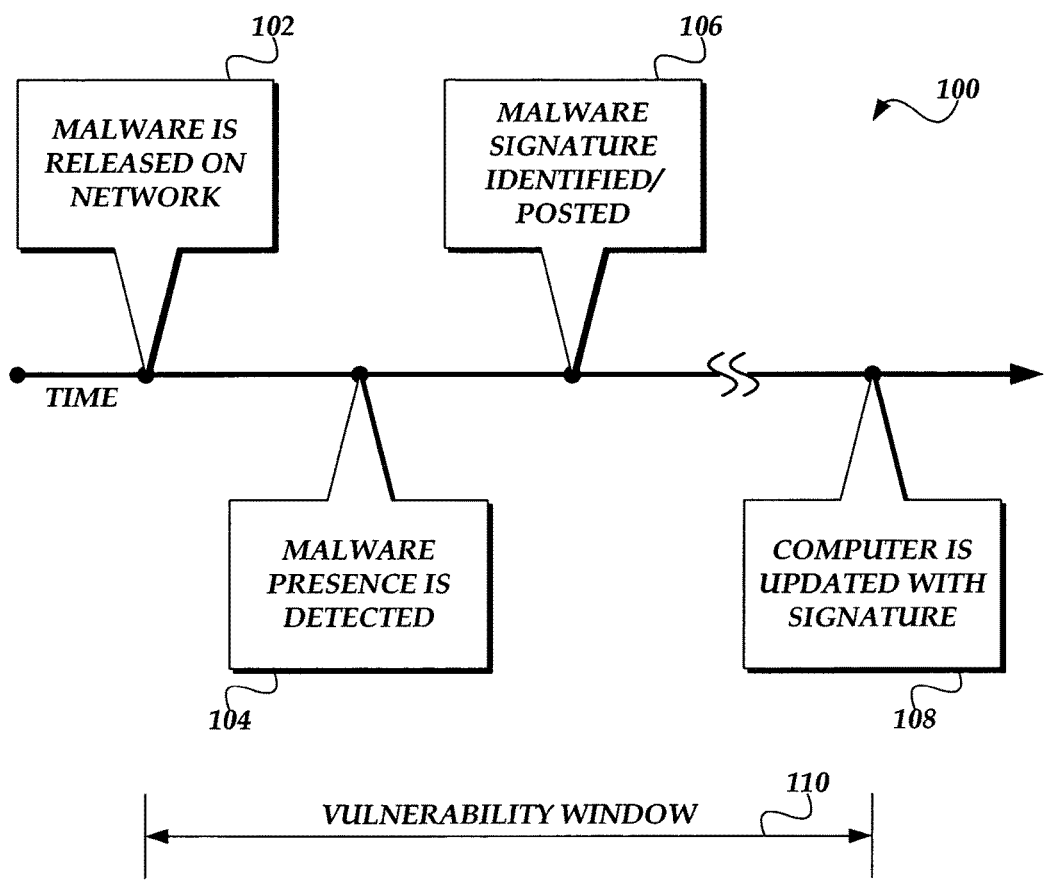
FIG. 1 is a block diagram of an exemplary timeline illustrating the vulnerability window associated with antivirus software, and particularly, to signature recognition methods.
Figure 2:
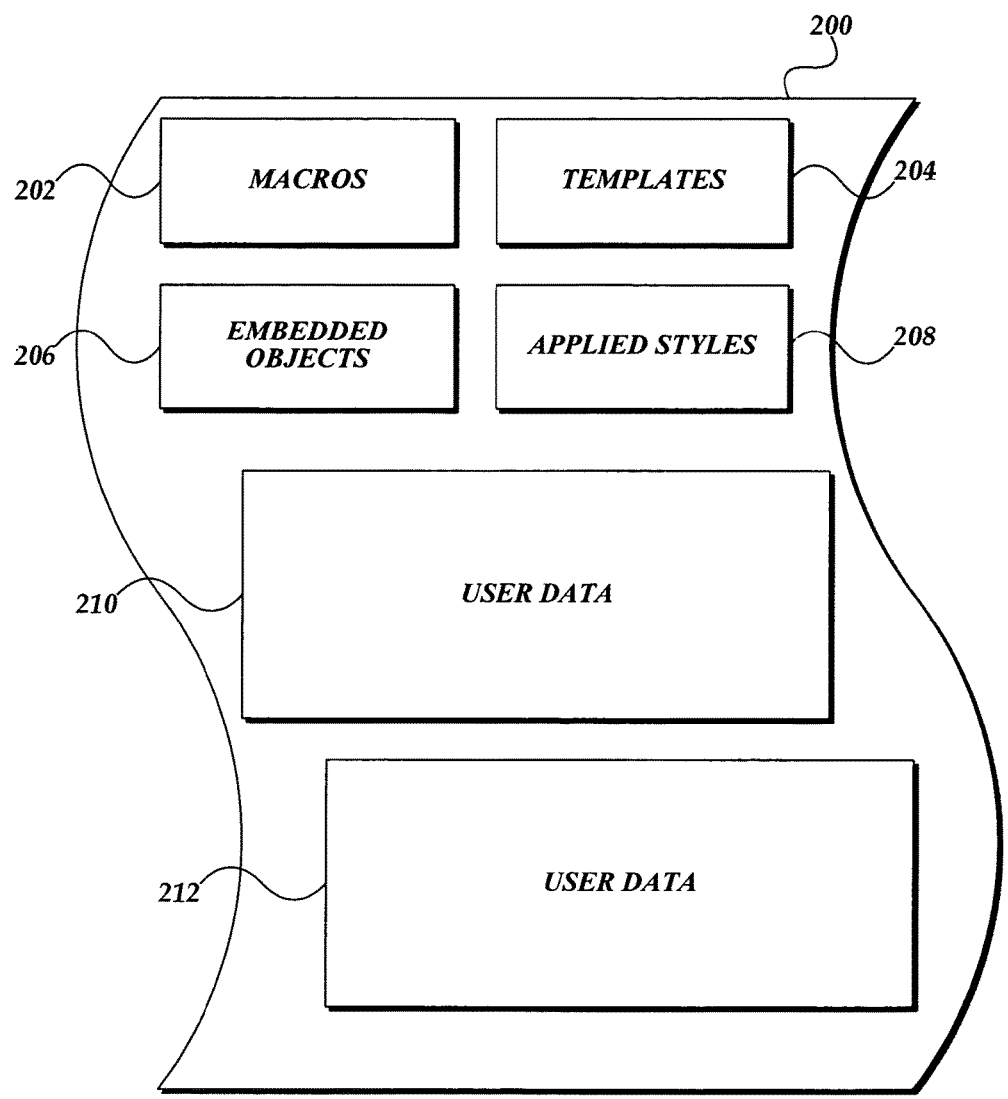
FIG. 2 is a block diagram illustrating an exemplary user-modifiable document.

Those skilled in the art will appreciate that a user-modifiable document includes numerous elements, some of which tend to be more permanent than others. It is generally those more permanent elements/portions of the document upon which the present invention bases its signature. FIG. 2 is a block diagram illustrating an exemplary user-modifiable document 200 and for discussing the various elements of the user-modifiable document.

As shown in FIG. 2, the user-modifiable document 200 includes various elements/portions such as macros 202, templates 204, embedded objects 206 such as Active X and COM objects, applied styles 208, and the like. Each of these elements tends to be more permanent, i.e., is not modified each time a user edits the user-modifiable document. Additionally, these are the types of document elements that contain the "core" of the malware. For example, malware creators embody their malicious designs in the form of macros or Active X controls. These are then place in user-modifiable files, such as word processing documents, spreadsheets, or images. Any information in the user data areas, such as user data areas 210 and 212, typically have little or no effect on the malware per se, but often include information that would entice a user to activate and/or release the malware onto the unsuspecting user's computer. Thus, as already mentioned, due to the nature of current signature-based detection systems, variants of malware are easily produced through cosmetic changes to the document.

It should be understood that while the present discussion may use the term "user-modifiable" file, it is for description purposes only, and represents only one type of file applicable for the present invention. As mentioned above, quite often malware, distributed as applications, will include data areas whose modification does not affect the functionality of the malware. These data areas will be referred to hereafter as superficial data areas. User-modifiable files include superficial data areas, i.e., areas that a user (or embedded malware) may modify without affecting the embedded malware. Accordingly, it should be understood that "user-modifiable" files or files with superficial data areas includes all files that include data areas whose modification affects the functionality of the malware (referred to generally as the more permanent portions of the file), and areas whose modification has no functional effect on the malware (referred generally as user-modifiable data areas or as superficial data areas.)

Figure 3:
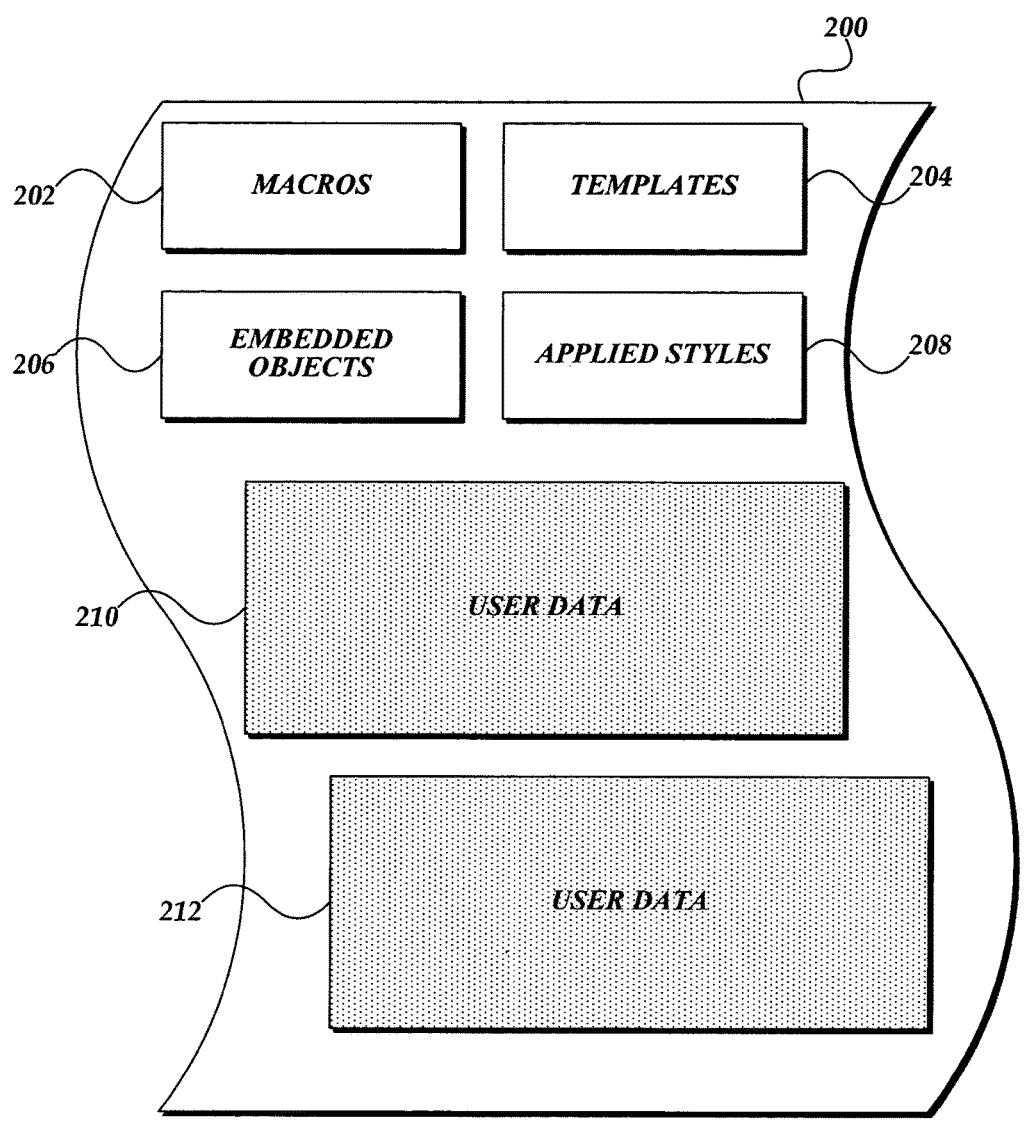
FIG. 3 is a block diagram illustrating the exemplary user-modifiable document of FIG. 2, and for further illustrating that only certain segments of the file are needed to develop a signature for the file.

FIG. 3 is a block diagram illustrating the exemplary user-modifiable document 200, and further illustrating that only portions of the documents are used in generating a signature for the document. As mentioned above, according to the present invention, when generating a file signature, the more permanent portions of a user-modifiable document, such as, but not limited to, macros 202, templates 204, styles 208, and embedded objects 206, are identified and used. Conversely, the user data portions, such as user data areas 210 and 212, are filtered out of the signature generation process.

As mentioned above, even when basing malware signatures on more permanent aspects of a user-modifiable file, malware detection does not always provide time-zero protection, i.e., protection the moment a malware file is released. According to aspects of the present invention, in order to provide time-zero protection to a computer or network, files that are trusted not to be malware are identified on a so-called white list. As a file arrives at a computer, but before it can be utilized on the computer, a signature for that file is generated and compared against a white list of files that are known to be trusted. According to further aspects of the present invention, the signature of the file, if the file is a user-modifiable file, is based on its more permanent portions, as discussed above. In this manner, a user-modifiable file can be edited and easily distributed among computers with full confidence that distribution of the file is trustworthy. Conversely, those files that cannot be matched against signatures in the white list are considered untrustworthy, and security policies can be carried out to protect the computer and/or network. In this manner, time-zero protection is realized.

Figure 4:
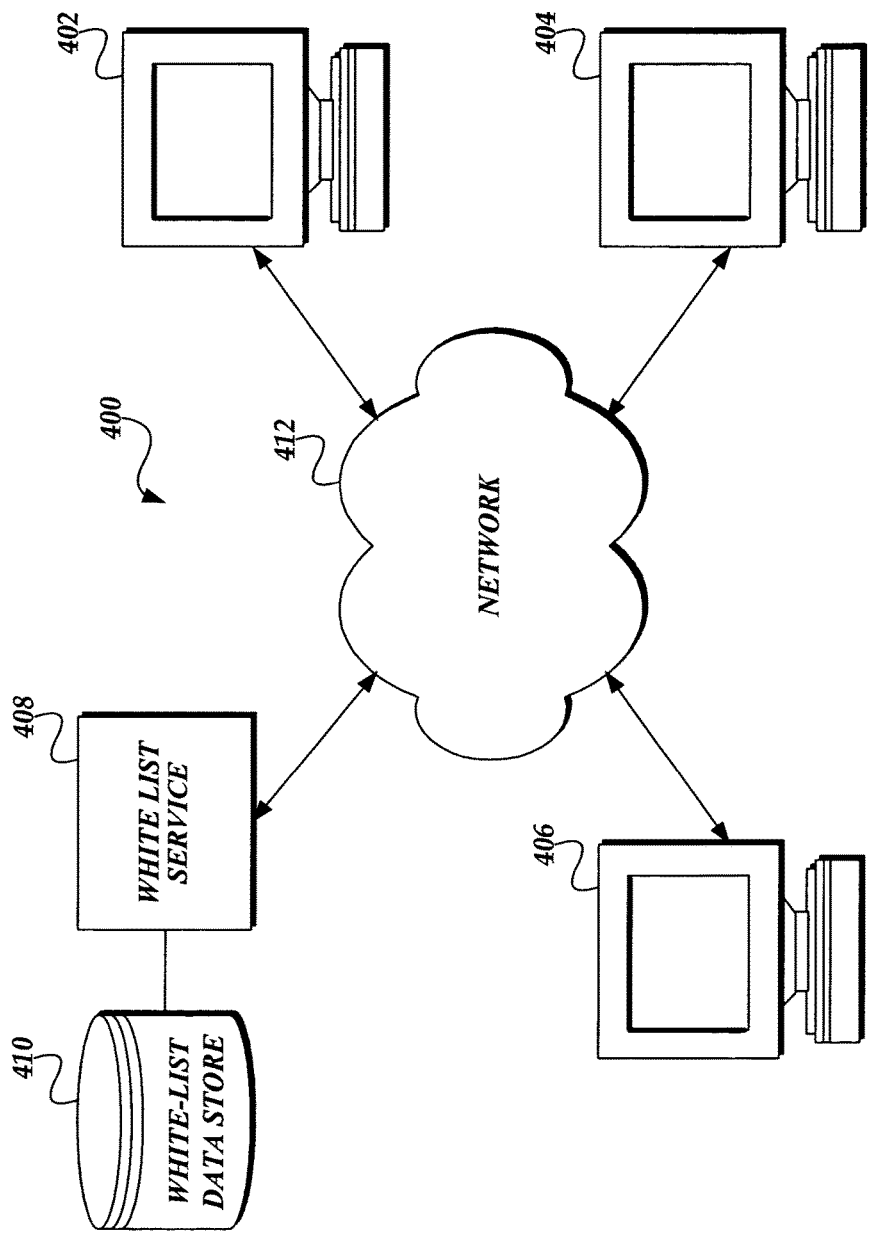
FIG. 4 is a pictorial diagram illustrating an exemplary networked environment suitable for implementing aspects of the present invention.

According to the present invention, a white list may be locally stored on a computer, on a trusted network location, or both. The present invention is not limited to any one configuration or arrangement. Additionally, according to one embodiment, a computer may rely upon a plurality of white lists for a variety of reasons, including efficiency and redundancy. FIG. 4 is a pictorial diagram illustrating one exemplary network configuration 400 of a white list available to a plurality of computers. As shown in FIG. 4, the exemplary network configuration 400 includes a white list service 408 that receives requests from computers, such as computers 402-406, to identify whether a received file is white listed. The white list service 408 may be a Web server connected to the Internet 412, but the present invention is not so limited.

While the white list service 408 may be strictly a white listing service, i.e., one that provides information as to files on a white list, alternatively, the white list service may provide information for both white listed files as well as black listed files, i.e., known malware.

The white list service 408 is illustrated as being coupled to a white list data store 410. The white list data store includes those files that have been identified as trustworthy files. In one embodiment, the white list data store 410 is a database of white listed files. While the present illustration identifies the white list service 408 and white list data store 412 as separate entities, it is a logical separation for illustration and discussion purposes. In an actual embodiment, the white list data store and the white list service may be incorporated as a single entity, or as a service offered on a computer.

While in one embodiment, the white list data store includes only signatures of white listed files, the present invention is not so limited. Quite frequently, the level of trust that a number of files have varies between files. For example, a file known to have been created by a user would likely enjoy a high level of trust by that same user. Similarly, a file created by a trusted party, accompanied by a digital signature attesting to its authenticity, may enjoy the highest level of trust. Alternatively, a file that has been quarantined in a so-called "sandbox" for several days, and that has not exhibited any signs of possessing malware, may be "trusted," but perhaps to a lesser degree than one digitally signed by a trusted source. Yet another alternative is that a particular file may receive positive feedback from users that it can be trusted. Such file may receive a trust level based on the volume of feedback regarding its trustworthiness, and be especially useful with regard to identifying spyware and adware. Thus, according to aspects of the present invention, the white list data store includes more than just file signatures of "trusted" files.

While the preceding discussion of the present invention has been made in reference to a computer, it should be understood that the present invention may be implemented on almost any computing device, including, but not limited to, computers that have a processor, a communications connection, and memory for storing information, and capable of performing file signature generation. For example, a suitable computing device may be a personal computer, a notebook or tablet computer, a personal digital assistant (PDA), mini- and mainframe computers, hybrid computing devices (such as cell phone/PDA combinations), and the like.

Figure 5:
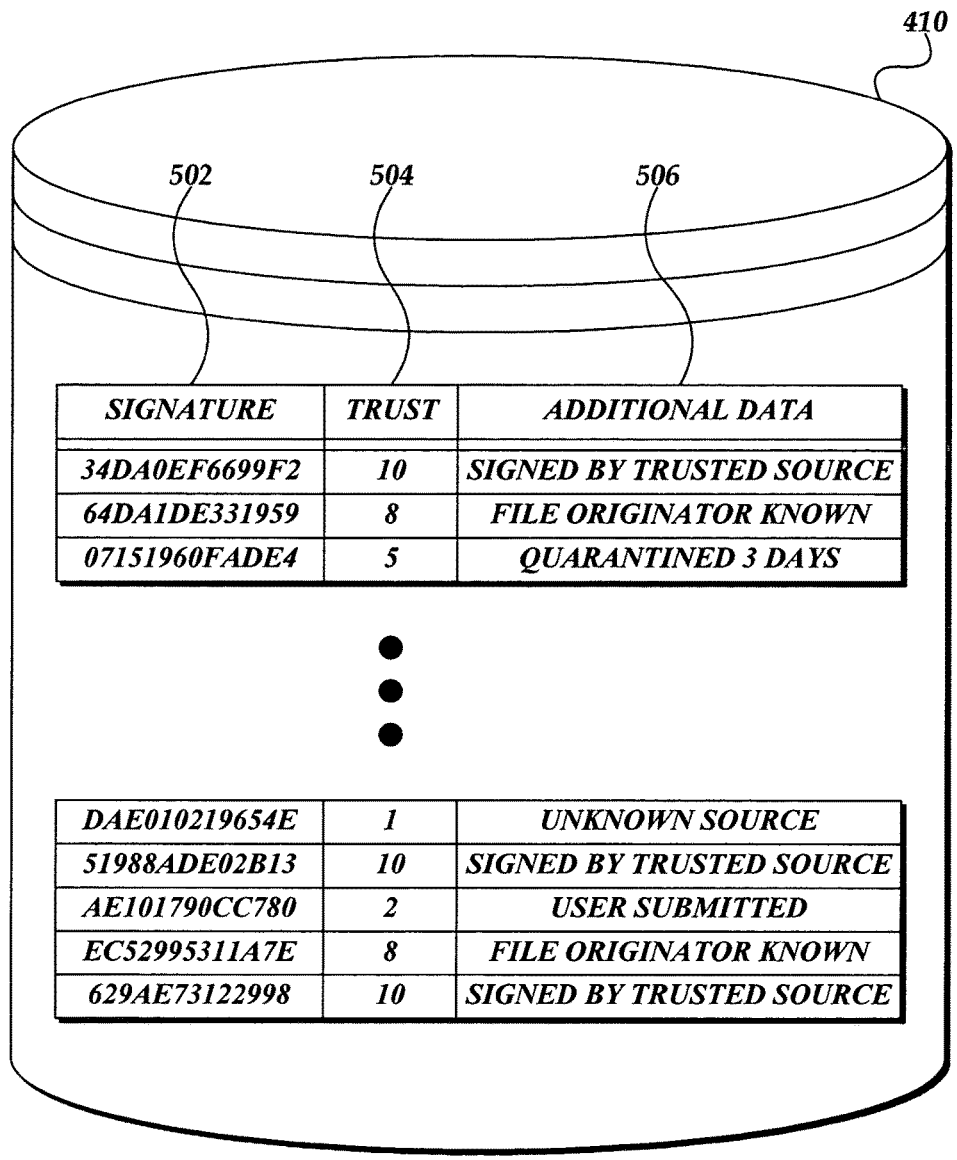
FIG. 5 is a block diagram illustrating an exemplary white list data store suitable for use in the present invention.

FIG. 5 is a block diagram illustrating exemplary fields that may exist in a white list data store 410. In one embodiment, the white list data store 410 will store a record for each white listed filed in the data store, and each record includes one or more fields for storing information. As shown in FIG. 5, each record in the white list data store 410 includes a signature field 502. The signature field stores the file signature, whether or not the file signature was generated based only on more permanent portions of a file. As mentioned above, it is frequently useful to identify the level of trust that a particular file enjoys. Thus, the exemplary records also include a trust field 504. As illustrated, the trust field includes a numeric value from 1 to 10, with 10 representing the highest trust and 1 the lowest. However, it should be understood that this ranking is illustrative only, and should not be construed as limiting upon the present invention. As yet a further alternative, the trust field 504 could also be used to identify malware. For example, if a file is assigned a trust level of 0, this could be an indication that the file is known to be malware.

Also shown in the white list data store 410 is an additional data field 506. The additional data field 506, as its name suggests, includes information that may be useful to a user with respect to the white listed file. As shown in FIG. 5, the additional data field could identify the reasoning behind the assigned trust level of a file, such as file originator or source, observed behaviors, lack of malware behaviors, and the like. Almost any pertinent information could be stored in the additional data field 506. Similarly, in alternative embodiments, any number of fields could be included in the white list data store 410.

Figure 6:
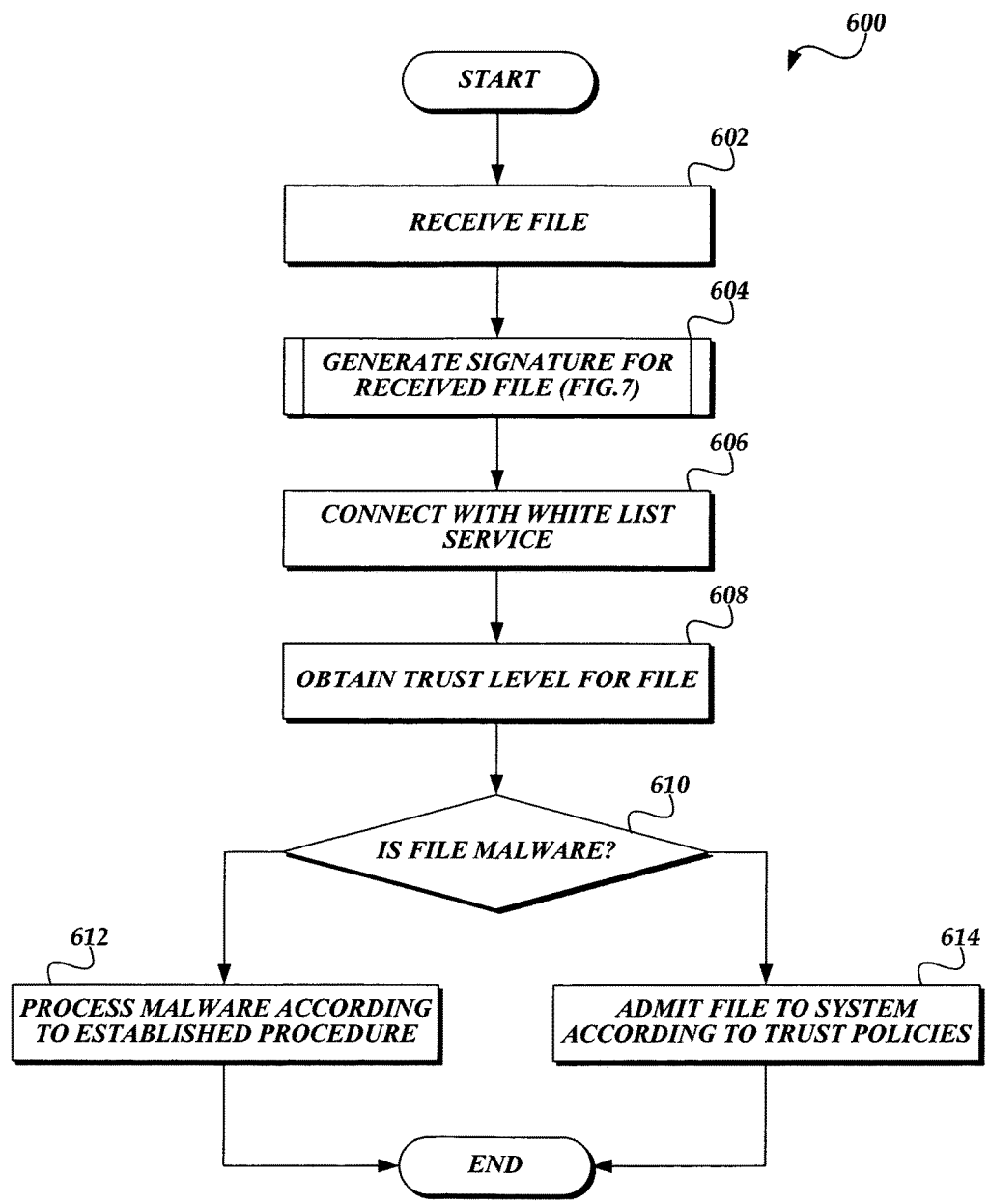
FIG. 6 is a block diagram illustrating an exemplary routine suitable for determining whether a file is white listed as a trusted file according to aspects of the present invention.

FIG. 6 is a flow diagram illustrating an exemplary routine 600 for determining whether a file is white listed as a trusted file. Beginning at block 602, the computer receives an unknown/untrusted file, meaning that the computer does not yet know whether the file is malware, or whether it has been white listed. At block 604, a signature is generated for the received file. Generating a signature for the file is described below in regard to FIG. 7.

Figure 7:
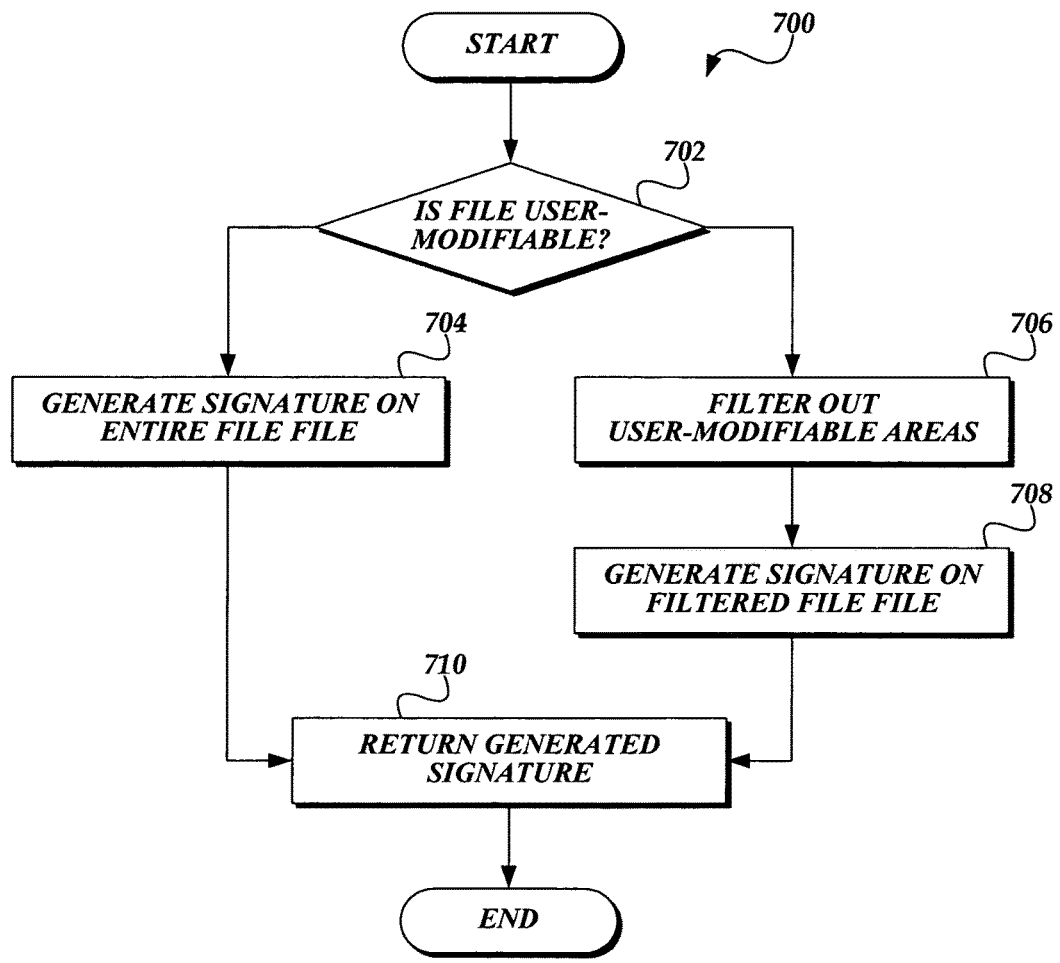
FIG. 7 is a block diagram illustrating an exemplary generate signature routine adapted according to aspects of the present invention.

FIG. 7 is a flow diagram illustrating an exemplary subroutine 700 for generating a file signature according to aspects of the present invention, and suitable for use by the routine 600 of FIG. 6. Beginning at decision block 702, a determination is made as to whether the file is a user-modifiable file. If the file is not a user-modifiable file, at block 704, the exemplary subroutine 700 generates a signature for the file based on the entire file. Thereafter, at block 710, the exemplary subroutine 700 returns the generated signature and terminates.

If the file is a user-modifiable file, at block 706, the exemplary subroutine 700 filters out the user-modifiable portions of the file. At block 708, the subroutine 700 then generates the file's signature based on the remaining, unfiltered portions of the file. After having generated the file's signature, at block 710, the exemplary subroutine 700 returns the generated signature and terminates.

With reference again to FIG. 6, after having generated the file's signature, at block 606, the exemplary routine 600 connects with a white list service 408. As discussed above, the white list service may be a local service/file installed on the computer or on a local area network, or alternatively, a remote white list service such as identified in FIG. 4. Additionally (not shown), there may be a plurality of white list services. For example, a white list service installed on the computer may contain a small number of file signatures that are frequently encountered by the computer. If a signature is not found in the local white list service, the computer may turn to a network white list service that contains a larger number of signatures. Still further, if a signature is not found on either the local or network white list services, a remote/global white list service, such as white list service 408 of FIG. 4, may be consulted. Of course, the remote white list service 408 will likely include only files that are globally available, such as help or service documents from an operating system provider. According to one embodiment, the local white list service is aware of, and in communication with, the network white list service, and the network white list service is aware of, and in communication with, the remote white list service, such that a single request to the local white list service successively checks another if the file's signature is not found.

After connecting with a white list service, at block 608, the routine 600 submits the signature and obtains a trust level corresponding to the file. At decision block 610, assuming the white list service also identifies malware (though the present invention is not so limited), a determination is made as to whether the file was identified as malware. If so, at block 612, the routine processes the malware according to established procedures. Processing malware is well known in the art, and includes actions such as deleting the file, quarantining the file, or purging the malware from the file. Thereafter, the routine 600 terminates.

If the file is not identified as malware according to the trust level obtained from the white list service 408, at block 614, the routine 600 admits the file to the computer system according to established policies relating to the level of trust for the file. For example, if the trust level is at its highest, the computer user is likely satisfied that the file is completely trustworthy, and can admit the file to the system for any purpose. Alternatively, if the trust level is fairly low, the computer system may be programmed to admit the file to the system with certain constraints, such as, but not limited to, quarantining the file for a period of time, executing the file within a so-called sandbox, disabling certain features network ability while the file operates, and the like. After admitting the file to the computer system, the exemplary routine 600 terminates.

While the above described routine 600 includes a binary, i.e., yes/no, determination in regard to whether the file is or is not malware, in an actual embodiment, a number of determinations may be made according to the trust level associated with the file. For example, a determination may be made as to whether the trust level is greater than a value of 8, such that any file with that level, or greater, of trust is automatically admitted. Similarly, files with trust levels between 3 and 7 may be required to execute within a so-called sandbox for some period of time. Still further, files with trust levels below 3 must be quarantined before admittance to the computer system. Accordingly, the exemplary routine 600 should be viewed as illustrative only, and should not be construed as limiting upon the present invention.

While various embodiments, including the preferred embodiment, of the invention have been illustrated and described, it will be appreciated that various changes can be made therein without departing from the spirit and scope of the invention.

The embodiments of the invention in which an exclusive property or privilege is claimed are defined as follows:

1. A computer system that identifies malware in received files, comprising:
   a processor;
   a computer connection for receiving a file; and
   a memory;
   wherein the computer system is configured to,
      receive a file with multiple parts, wherein the multiple parts include at least one superficial data area within the file and a plurality of permanent data areas within the file, wherein the at least one superficial data area is different from the plurality of permanent data areas;
      determine whether the file is a user-modifiable file based on identifying the at least one superficial data area of the file representing a user data area modifiable by a user and whose modification has no effect on potential malware within the plurality of permanent data areas; and
      when the file is a user-modifiable file:
         filter out the at least one superficial data area of the file to define a remaining unfiltered portion of the file, wherein the unfiltered portion of the file includes a combination of the plurality of permanent data areas;

generate a file signature from only a filtered version of the file based on the remaining unfiltered portion of the file;

ascertain a level of trustworthiness of the file by comparing the file signature against file signatures included in a white list and corresponding to files known to be trustworthy, wherein the level of trust-worthiness is based on a corresponding level of trustworthiness of a matching file signature included in the white list;

admit the file according to the level of trustworthiness of the file; and determine at least one constraint to apply to the file based on the level of trustworthiness associated with the file.

2. The computer system of claim 1, wherein the white list further includes file signatures corresponding to files identified as malware, and wherein the computer system is configured to ascertain whether the file is malware by comparing the file signature to file signatures in the white list corresponding to files identified as malware.

3. The computer system of claim 2, wherein the white list is remote to the computer system, and wherein the computer system is configured to access the white list via the computer connection.

4. The computer system of claim 1, wherein the admittance of the file varies in accordance with a varying level of trustworthiness, the admittance of the file comprising automatically admitting the file if a first level of trustworthiness is determined, and the admittance of the file comprising a delayed admittance of the file if a second level of trustworthiness is determined.

5. The computer system of claim 1, wherein the level of trust-worthiness is a numerical value.

6. The computer system of claim 5, wherein the level of trustworthiness associated with the file is based on feedback obtained from one or more users regarding a trustworthiness of the file.

7. The computer system of claim 5, wherein the constraint is quarantining the file for a period of time before admitting the file to the file system.

8. The computer system of claim 7, wherein the constraint is disabling features associated with the file while the file is admitted to the file system.

9. The computer system of claim 1, wherein the level of trustworthiness is based on a volume of feedback associated with the file.

10. A method performed in a computing environment whereby instructions stored upon one or more computer readable media are executed upon one or more computer processors, the method comprising:

receiving a file with multiple parts, wherein the multiple parts include at least one superficial data area within the file and a plurality of permanent data areas within the file, wherein the at least one superficial data area is different from the plurality of permanent data areas;

determining whether the received file is a user-modifiable file based on identifying the at least one superficial data area of the file representing a user data area modifiable by a user and whose modification has no effect on potential malware within the plurality of permanent data areas; and when the received file is a user-modifiable file:

filtering out the at least one superficial data area of the received file to define a remaining unfiltered portion of the file, wherein the unfiltered portion of the file includes a combination of the plurality of permanent data areas;

generating a file signature from only a filtered version of the received file based on the remaining unfiltered portion of the file;

ascertaining a level of trustworthiness of the received file by comparing the file signature against file signatures included in a white list and corresponding to files known to be trustworthy, wherein the level of trust-worthiness is based on a corresponding level of trustworthiness of a matching file signature included in the white list;

admitting the received file according to the level of trustworthiness of the received file; and determining at least one constraint to apply to the file based on the level of trust-worthiness associated with the file.

11. The method of claim 10, wherein the admittance of the received file varies in accordance with a varying level of trustworthiness, the admittance of the received file comprising executing the received file within a sandbox for a period of time if a first level of trustworthiness is determined, and the admittance of the received file comprising quarantining the received file before admitting the received file if a second level of trustworthiness is determined.

12. The method of claim 10, wherein the white list is located on a computing device.

13. The method of claim 10, wherein the white list further includes file signatures corresponding to files of known malware, the ascertaining further comprising comparing the file signature to the file signatures corresponding to files of known malware.

14. The method of claim 10, wherein the level of trustworthiness is a numerical value.

15. A computer-readable storage device having stored thereon computer executable instructions for carrying out the following acts:

receiving a file with multiple parts, wherein the multiple parts include at least one superficial data area within the file and a plurality of permanent data areas within the file, wherein the at least one superficial data area is different from the plurality of permanent data areas;

determining whether the file is a user-modifiable file based on identifying the at least one superficial data area of the file representing a user data area modifiable by a user and whose modification has no effect on potential malware within the plurality of permanent data areas; and when the file is a user-modifiable file:

filtering out the at least one superficial data area of the file to define a remaining unfiltered portion of the file, wherein the unfiltered portion of the file includes a combination of the plurality of permanent data areas;

generating a file signature from only a filtered version of the file based on the remaining unfiltered portion of the file, wherein the file signature is a single signature encompassing a plurality of portions of disparate types included in the filtered version of the file;

ascertaining whether the file is malware by comparing the file signature against file signatures included in a white list and corresponding to files known to be trustworthy;

admitting the file in accordance with a level of trustworthiness of the file; and determining at least one constraint to apply to the file based on the level of trustworthiness associated with the file.

16. The computer-readable storage device of claim 15, wherein the admittance of the file comprises automatically admitting the file if a first level of trustworthiness is determined, and wherein the admittance of the file comprises quarantining the file before admitting the file if a second level of trustworthiness is determined.

17. The computer-readable storage device of claim 16, wherein the white list is located within a computing device.

18. The computer-readable storage device of claim 15, wherein the white list further includes file signatures corresponding to files of known malware, and wherein the ascertaining further comprises comparing the file signature to the file signatures of known malware.

19. The computer-readable storage device of claim 15, wherein the ascertaining comprises ascertaining a level of trustworthiness associated with the file based on a corresponding level of trustworthiness of a matching file signature included in the white list.

20. The computer-readable storage device of claim 15, wherein the plurality of permanent data areas include at least one of a macro, a template, a style, or an embedded object.

* * * * *